United States Patent Office 3,411,650
Patented Nov. 19, 1968

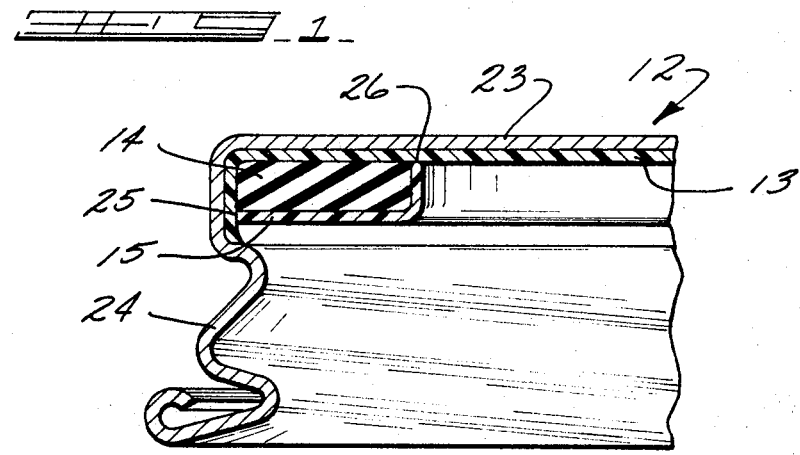
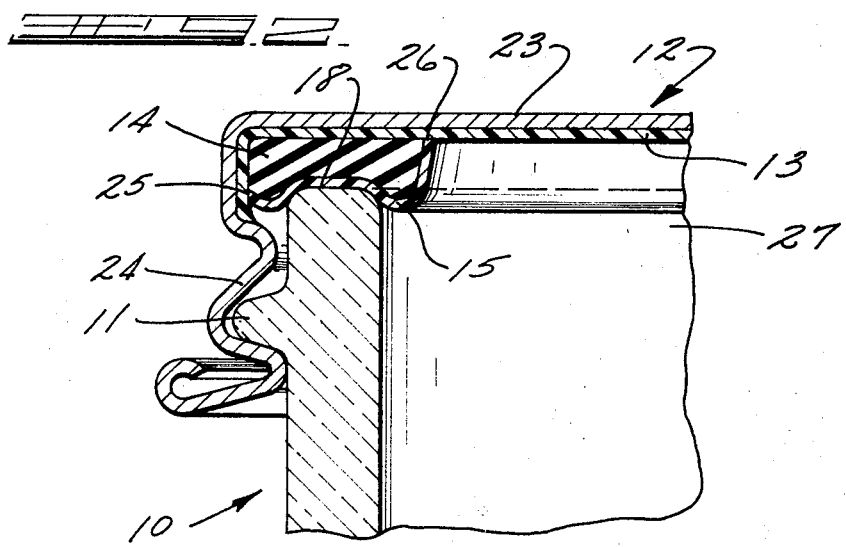

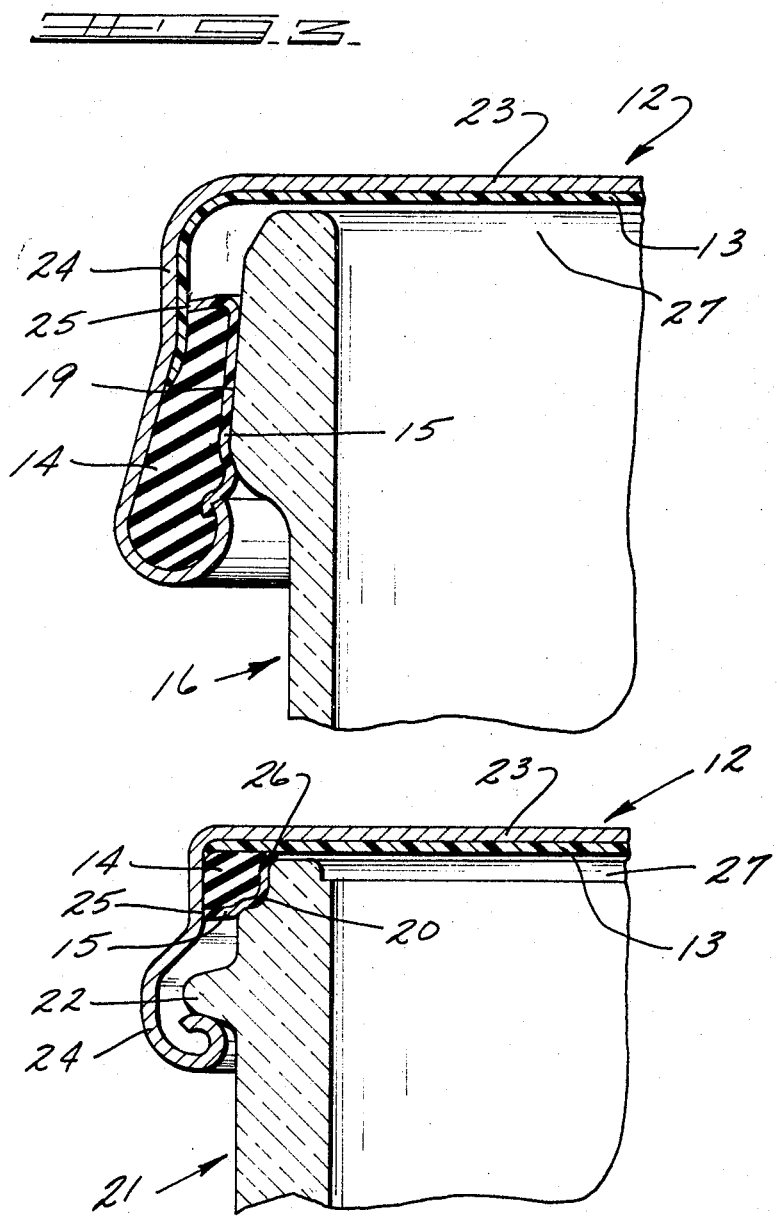

3,411,650
CLOSURE AND SEALING MEDIUM FOR GLASS JARS AND OTHER CONTAINERS
George V. Mumford, Toledo, Ohio, assignor to Owens-Illinois, Inc., a corporation of Ohio
Filed Sept. 19, 1966, Ser. No. 580,483
7 Claims. (Cl. 215—40)

ABSTRACT OF THE DISCLOSURE

A gasket of composite fabrication for sealing closures onto containers such as bottles or jars. The gasket comprises an elastomeric component and bonded thereto an enveloping viscoelastic component, the latter being internally disposed in the closure relative to the elastomer; and both are exteriorly disposed relative to the container sealing surface. The sealing interface is to be disposed between the container sealing finish and the elastomeric component and within and in contact with the viscoelastic component.

---

This invention relates to closures for bottles and jars and more particularly to an improved method of effectuating a hermetic seal between closures and glass, plastic or other like containers; these seals may be either of the top, side or corner seal type or combinations thereof.

The advances in scientific technology in the last several decades have resulted in nearly exclusive utilization of either rubber or plastisols as the sealing medium used to hermetically seal glass and other like containers. Each of these materials are generally recognized as inherently possessing certain desirable characteristics which the other does not possess. Rubber, for example, is traditionally recognized as being much more elastic than are the plastisol sealing materials. This increased elasticity of rubber, or what is more commonly termed resiliency, gives rubber the property of a springlike mass and results in a tighter seal with the container than that resulting from use of plastisols as a sealing gasket; that is, when rubber undergoes a compressive stress, as it does when the closure with which it is incorporated is telescoped over a container, it has a greater tendency to attempt to regain its original shape than does a plastisol; consequently, it produces a resultant force against the container sealing finish which greatly exceeds that produced by a plastisol. Furthermore, because of this increased resiliency rubber has the greater ability to withstand mechanical abuses of the container during handling, and yet maintain a desirable seal. Plastisols, however, are recognized as being more viscous materials than are rubber compositions. Because of this intrinsic viscous characteristic, or the ability to flow, plastisols have the innate ability of sealing and conforming to microscopic defects in the sealing finish of the container; a rubber gasket, in contradistinction to the plastisol, tends to bridge or span over these minute defects because of the lack of suitable flow characteristics.

Another factor of importance in determining which of the two materials will be used to effectuate a seal, especially when the sealing material is to provide a hermetic seal for comestible goods, is the possibility of deleterious effects when contact is made between the sealant and the material being sealed within the container. Certain rubber compositions, oftentimes those which are most economical to use, are not acceptable by the FDA, for utilization as a sealant, when comestibles are involved. Plastisols, on the hand, can be easily formulated to meet other FDA requirements and generally such formulations only nominally increase the sealant cost.

Accordingly, it is an object of this invention to provide for a sealing medium, to be used in conjunction with a closure and glass or other like containers, which allows rubber sealants to be used which, but for their utilization in this invention, would not meet FDA requirements.

It is another object of this invention to provide for a sealing medium, to be used in combination with a closure and container, which will simultaneously and concurrently possess the beneficial, highly elastic, sealing properties of rubber and the preferential ability of plastisols to seal the microscopic imperfections in the glass finish.

In the achievement of the foregoing, and other objects, this invention contemplates a sealing medium, or gasket, of composite fabrication, said sealant including an elastomeric material, such as natural or synthetic rubber, to which is bonded a layer of viscoelastic formulation; the latter completely isolates the elastomeric material from any possible contact with the material retained within the container and provides for a sealing interface, that is, the interface between the sealing finish of the container and the sealant or sealing medium, which is disposed between the elastomeric component of said composite sealant and the container sealing finish, and exists within, and in contact with, the bonded viscoelastic component of said sealing medium.

The foregoing and other objects, will become apparent by reference to the appended drawings, of which:

FIGURE 1 is a partial sectional view on an enlarged scale, of a closure cap of the top seal type prior to insertion upon a container, showing an embodiment of the invention.

FIGURE 2 is a partial sectional view of a top seal closure, having incorporated therein the sealant of this invention, shown in sealing relationship with the finish of a glass, or other like container.

FIGURE 3 is a fragmentary sectional view of a closure of the side seal type in sealing relation with a container and utilizes the sealant of this invention.

FIGURE 4 is a fragmentary sectional view of a container and closure, in sealed relationship, showing the utilization of this invention to effectuate a corner seal.

The drawings generally show the practice of this invention in conjunction with closures of the lug, press-on or screw-on type and illustrates its utilization with top, side and corner sealed containers.

In the drawings, conventional closures 12 of the top, side and corner sealing type, adapted to be telescoped over the mouth 27 of a container and to provide a locked or fastened relationship therewith are shown; they generally comprise a top panel portion 23 and a skirt portion 24 depending therefrom. These closures are illustrated as having an internal lacquer coating 13 which function is to provide a barrier, between the contained product and the closure material itself, said material typically being tin plate, and thereby prevent contamination or deleterious affects upon the material stored in the container. These lacquers are conventionally used and may for example, be a vinyl chloridevinyl acetate copolymer having an oleoresinous modifier, such as a tung oil modified phenol-formaldehyde, dissolved in a suitable solvent.

Referring to FIGURES 1 and 2, a container 10 which may be of glass, plastic or the like composition is shown; it is provided with a means for lockingly engaging the closure, as for example by an externally disposed screwthread 11, and a top sealing finish 18 which engages the gasket or sealing medium to effectuate a hermetic seal. The sealing medium, which is shown as a composite annular member, nested within the closure and being so disposed as to sealantly engage the container finish, is comprised of a highly elastomeric substance 14 and a layer of a viscoelastic material 15 bonded thereto. This viscoelastic component of the composite sealant is bonded to the elastomeric component so as to completely isolate the latter from any contact with the material stored within the container; additionally, the viscoelastic material is disposed between the elastomer and the container sealing finish, thereby resulting in container sealing contact with the viscoelastic and not the elastomeric component. Furthermore, since the viscoelastic medium is disposed internally relative to the elastic component of the sealant, and since the former is intended to isolate and envelop the latter, the former of necessity comes into contact with the closure and its lacquered surface; the contact areas are generally designated 25 and 26 in the drawings.

While FIGURE 1 shows the sealant as an annular member, it should be obvious that this sealant could comprise a composite disc, said disc being coextensive with internal surface of the closure panel.

The inventor has found that, by utilizing a composite fabricated sealant as herein described, the sealing characteristics produced are far superior to those obtainable when the materials are used independently. First of all, because the sealing interface exists within and in contact with the viscoelastic material, miscroscopic imperfections in the glass sealing finish are filled because of flow capability of this material. Secondly, since the elastomer is in a state of compression during sealing, and because it is disposed between the closure interior and the primary viscoelastic sealant layer, the elastomer produces a resultant compressive force on this layer which causes it to make tighter contact with the container, hence a far superior seal.

Likewise, FIGURE 3 illustrates a container 16 having a side sealing finish 19, which is superiorly sealed by using the composite, elastomer-viscoelastomer sealant.

In FIGURE 4, the container 21, is shown with an engaging lug 22 for fastening the closure thereto; it possesses a corner sealing finish 20 to sealantly engage with the sealing medium of this invention.

The inventor has successfully practiced this invention by bonding viscoelastic materials to closures equipped with conventional elastomeric gaskets, i.e., natural rubber or synthetic rubbers, such as butadiene-acrylonitrile or butadiene-styrene rubbers. These viscoelastic materials were applied, into the closures and into the rubber gaskets, as a paste having a sufficient viscosity to allow the use of commercially available "flow-in" gasket equipment and being able to flow sufficiently to enable this material to completely envelop the rubber gaskets when the closure cap is subjected to a spinning cycle. Specifically, the inventor has successfully used plastisol compositions, for example, a vinyl plastisol manufactured and sold by the Dewey & Almy Chemical Division of the W. R. Grace & Company as their No. 3740, as the viscoelastic medium. The plastisol was applied at a temperature of 100° F., using conventional "flow-in" nozzles and spinning equipment; curing of the plastisol and the bonding thereof to the rubber gasket was accomplished by heating at 300–400° F., for several minutes. While it is generally felt that no need exists for using an adhesive to supplement the bonding of the plastisol to the rubber, or for bonding the plastisol to the lacquered portion of the closure, said latter bond being an incident of using the plastisol to isolate the rubber component of the gasket from the contents of the container, a superior bond may be produced if an adhesive is used. Examples of adhesive which may be used to provide such a bond are: Unichrome 219 PX, which is a butadiene-acrylonitrile rubber lacquer; or B. F. Goodrich A458B adhesive.

Having described the invention, I claim:

1. In combination with a container having a sealing finish defining an open mouth thereof and adapted to lockingly engage a closure, a closure having a top panel portion and an attaching skirt depending therefrom, said closure being adapted to be telescoped over the container mouth and to be brought into locking engagement with said container, a sealing medium nested within said closure to sealingly engage the sealing finish of the container; said sealing medium being of composite fabrication and comprising an elastomeric component and bonded thereto an enveloping viscoelastic component comprised of a plastisol composition, said viscoelastic component being internally disposed, relative to said elastomer, and exteriorly disposed, relative to the container sealing finish, thereby causing the sealing interface to exist between the container finish and said elastomeric component and within and in contact with said viscoelastic component.

2. The combination of claim 1, wherein the elastomeric component of the composite sealing medium is natural rubber.

3. The combination of claim 1, wherein the elastomeric component of the composite sealing medium is a synthetic rubber.

4. The combination of claim 1, wherein the elastomeric component of the composite sealing medium is a butadiene-acrylonitrile rubber.

5. The combination of claim 3, wherein the synthetic rubber is a butadiene-styrene rubber.

6. The combination of claim 1, where the plastisol composite sealing medium is a vinyl plastisol.

7. The combination of claim 2, wherein the plastisol composition of said viscoelastic component is a vinyl plastisol.

References Cited
UNITED STATES PATENTS

| | | | |
|---|---|---|---|
| 2,626,073 | 1/1953 | Miller | 215—40 |
| 2,783,597 | 3/1957 | Hohl et al. | 215—40 X |
| 3,174,640 | 3/1965 | Hart | 215—40 |
| 3,258,148 | 6/1966 | Unger | 215—40 |

DONALD F. NORTON, *Primary Examiner.*

UNITED STATES PATENT OFFICE
CERTIFICATE OF CORRECTION

Patent No. 3,411,650                                November 19, 1968

George V. Mumford

It is certified that error appears in the above identified patent and that said Letters Patent are hereby corrected as shown below:

Column 4, line 43, after "plastisol" insert -- composition of the --.

Signed and sealed this 17th day of March 1970.

(SEAL)
Attest:

Edward M. Fletcher, Jr.                       WILLIAM E. SCHUYLER, JR.
Attesting Officer                                    Commissioner of Patents